(12) United States Patent
Torabi

(10) Patent No.: US 8,046,408 B2
(45) Date of Patent: Oct. 25, 2011

(54) VIRTUAL REALITY SYSTEMS AND METHODS

(75) Inventor: Mohammad Torabi, Dana Point, CA (US)

(73) Assignee: Alcatel Lucent, Paris (FR)

(*) Notice: Subject to any disclaimer, the term of this patent is extended or adjusted under 35 U.S.C. 154(b) by 2315 days.

(21) Appl. No.: 09/933,582

(22) Filed: Aug. 20, 2001

(65) Prior Publication Data

US 2003/0037101 A1    Feb. 20, 2003

(51) Int. Cl.
*G06F 15/16* (2006.01)
(52) U.S. Cl. .................................................. 709/204
(58) Field of Classification Search ............... 709/204
See application file for complete search history.

(56) References Cited

U.S. PATENT DOCUMENTS

| | | | |
|---|---|---|---|
| 5,588,139 A | 12/1996 | Lanier et al. | |
| 5,793,382 A * | 8/1998 | Yerazunis et al. | 345/474 |
| 5,898,780 A * | 4/1999 | Liu et al. | 713/155 |
| 5,966,310 A * | 10/1999 | Maeda et al. | 1/1 |
| 5,980,256 A * | 11/1999 | Carmein | 434/55 |
| 6,032,084 A | 2/2000 | Anderson et al. | |
| 6,084,587 A | 7/2000 | Tarr et al. | |
| 6,167,253 A * | 12/2000 | Farris et al. | 455/412.2 |
| 6,215,498 B1 * | 4/2001 | Filo et al. | 345/419 |
| 6,219,045 B1 * | 4/2001 | Leahy et al. | 715/757 |
| 6,226,669 B1 * | 5/2001 | Huang et al. | 709/204 |
| 6,244,987 B1 | 6/2001 | Ohsuga et al. | |
| 6,400,722 B1 * | 6/2002 | Chuah et al. | 370/401 |
| 6,430,997 B1 * | 8/2002 | French et al. | 73/379.04 |
| 6,711,147 B1 * | 3/2004 | Barnes et al. | 370/338 |
| 6,731,314 B1 * | 5/2004 | Cheng et al. | 715/848 |
| 6,738,362 B1 * | 5/2004 | Xu et al. | 370/329 |
| 6,901,369 B2 * | 5/2005 | Cureton et al. | 705/1 |
| 7,032,241 B1 * | 4/2006 | Venkatachary et al. | 726/4 |
| 7,058,022 B1 * | 6/2006 | Carolan et al. | 370/254 |
| 2002/0132616 A1 * | 9/2002 | Ross et al. | 455/419 |
| 2002/0149470 A1 * | 10/2002 | Mynatt et al. | 340/10.1 |
| 2003/0014212 A1 * | 1/2003 | Ralston et al. | 702/150 |

FOREIGN PATENT DOCUMENTS

WO    WO 01/58143 A1    8/2001

OTHER PUBLICATIONS

Jain, et al., *Multiple Perspective Interactive Video*, 1995, pp. 202-211.
3D Image Conference 2000, Shimada, et al., *3D Mobile Cyber Communication*.

(Continued)

*Primary Examiner* — Wing Chan
*Assistant Examiner* — Alicia Bauturay
(74) *Attorney, Agent, or Firm* — Fay Sharpe LLP

(57) ABSTRACT

Virtual reality system facilitating the setup and conduction of a virtual reality episode by receiving virtual reality data captured by virtual reality environment (VRE) user equipment, and transmitting the virtual reality data via a network to other virtual reality components capable of presenting the virtual reality data. The setup and conduction of the virtual reality episode occurs in real-time, such that a user can participate in an episode that represents events presently occurring in an environment. The VRE user equipment includes wireless devices such that one or more mobile users at a plurality of locations may simultaneously participate in a virtual reality episode.

22 Claims, 2 Drawing Sheets

OTHER PUBLICATIONS

Singhal et al., "Networked Virtual Environments," ACM Press, pp. 1-18; 87-99 (1999).

Barfield et al., "Fundamentals of Wearable Computers and Augmented Reality," Lawrence Erlbaum Associates, pp. 3-26; 715-745 (2001).

Walrand et al., "High-Performance Communication Networks," Second Edition, Morgan Kaufmann Publishers, pp. 114-127 (2000).

Tabbane, "Handbook of Mobile Radio Networks," Artech House, Inc., pp. 311-367; 544-585 (2000).

* cited by examiner

VIRTUAL REALITY SYSTEMS AND METHODS

FIELD OF THE INVENTION

The present invention relates generally to virtual reality systems, and more particularly, to virtual reality systems capable of allowing mobile and wireless access to real-time sights and sounds of complex environments.

BACKGROUND OF THE INVENTION

Conventional virtual reality systems use computers and peripheral devices to enable users to perceive and interact with computer generated worlds. In a typical virtual reality system, a user wears garments outfitted with devices which provide information about the position and orientation of the user relative to a fixed reference point. The information is used by the computer system to create a virtual being, where the virtual being emulates the position, orientation, and movements of the user. The database also includes a virtual environment in which the virtual being exists, and the virtual being may act upon virtual objects in the virtual world in a manner which emulates the actions of the user. For example, the virtual being may pick up a virtual ball and throw it, or the virtual being may drive a virtual car.

To allow the user to perceive the virtual world and the actions his or her virtual being within it, the computer animates the virtual world together with the virtual being and projects the virtual world from the viewpoint of the virtual being on a head mounted display. As the user moves around, his or her actions are sensed by the instrumented garment and used by the computer to alter the position and orientation of the virtual being within the virtual world. The displayed image is also modified to follow the viewpoint of the virtual being so that the user is led to believe he or she actually exists in the virtual world. Thus, a user may lower his or her head and look underneath a virtual object, or the user may walk over to a virtual light switch and, by appropriate movements of the user's hand, turn the switch on and off.

Presently, the availability of virtual reality services is limited to fixed and non-real-time phenomena such as entertainment machines and flight simulators. In conventional virtual reality systems, the "environment" that a person experiences is manufactured and contained in computer memory. For instance, flight simulators used for training professional pilots and astronauts are a type of virtual reality system commonly in use today, where computer animation is used to create the user environment. Although most user interactive, three dimensional virtual reality systems use computer graphics to model an environment, some limited fixed real-time services requiring low data transmission rate, such as video conferencing and net-meetings, are also offered in which a user can view a real-life environment rather than a computer generated one. Unfortunately, these services do not allow three-dimensional user-controlled involvement of the remote environment and are generally limited to viewing images on a television screen rather than viewing a three dimensional representation of a remote real-life environment. However, the applications for "virtual reality" will continue to grow and are anticipated as being increasingly common to remotely model and allow participation in an environment. For instance, in the future doctors will be able to participate in medical procedures although located geographically distant from the patient, and businesses will be able to conduct a conference session depicting, to every participant, the presence of others in a virtual conference.

There are a few major obstacles and bottlenecks to the achievement of such an ambitious goal, including the creation of Virtual Reality Environment (VRE) capable user terminal equipment, high speed data transmission over, and controlling network elements for initiating, establishing, maintaining and terminating VRE events. Because high speed data transmission networks and user terminal equipment exist and are continuously being improved, what is needed is a controlling network containing elements to implement the real-time virtual reality environment. The development of the software platform for the control and management of VRE services is considered to be a major challenge for each VRE application in terms of its control logic and its application programming interface (API).

SUMMARY OF THE INVENTION

The present invention is a virtual reality system and method which allows physical environments to have a virtual presence everywhere in real time. The concept of the VRE or Virtual Presence Environment (VPE) makes the presentation and presence of the sounds and sights of an actual and complex physical environment virtually available everywhere in real-time through the use of VRE capable networks and devices, including mobile telecommunications devices and networks.

As referred to herein, a virtual reality episode is the presentation of virtual reality data to a user via VRE user equipment, where virtual reality data includes audio, video, textual, and like data representing an environment, such as an actual physical environment. The virtual reality system of the present invention facilitates the setup of the virtual reality episode by receiving virtual reality data captured by VRE user equipment and/or generated by a computer, and transmitting the virtual reality data via a network, such as a packet-switched network, to other components capable of presenting the virtual reality data. According to one aspect of the invention, the setup and conduction of the virtual reality episode occurs in real-time, such that a user can participate in an episode that represents events presently occurring in an environment. Therefore, the system of the present invention allows a first user at a first geographical location to participate in a virtual reality episode with a second user at a second geographical location that is remote from the first geographical location. Virtual reality episodes enabled by the present invention may comprise one or more users experiencing a remote and/or computer generated environment as is they were actually in the environment. Users experience the episode through VRE User Equipment, which comprises one or more virtual reality components that are known in the art for displaying the virtual reality episode. According to one aspect of the invention, the VRE User Equipment of the present invention comprises wireless devices such that one or more mobile users at a plurality of locations may simultaneously participate in a virtual reality episode.

According to another aspect of the present invention, the VRE User Equipment also captures images, video, audio, textual and like data associated with an actual environment (also referred to herein as an actual physical environment). This virtual reality data is then received by one or more components of the virtual reality system and distributed to other users that are participating in the virtual reality episode and in communication with the virtual reality system via a wireless or hard-wired connection. For instance, audio and video representing the actual environment a first user experiences may be transmitted to a second user so that the second user may experience the actual environment as if he were actually in that environment. Because the VRE User Equipment may present images and audio to a user in three-dimensions, a user's experience in the virtual environment will be lifelike.

The system of the present invention includes an Episode Management Entity that identifies the one or more users and associated user equipment involved in a virtual reality episode, transmits requisite virtual reality data to each user's respective user equipment via one or more channels and/or systems, and conducts the virtual reality episode. Using the system of the present invention, one or more users may immerse themselves in an actual physical environment in which another user actually resides. Similarly, using the present invention, one or more users can immerse themselves in a computer-generated environment in which none of them resides.

Examples of VRE services (virtual reality episodes) facilitated by the present invention include (1) a conference session depicting, to every participant, the presence of others in a virtual conference room with a projector screen, drawing board, and so on; (2) a virtual movie theater where the user can view movies in real size and sound; (3) a hospital operation room where a surgeon can perform a real operation remotely or train interns by showing the procedure in a virtual operating room; (4) a virtual concert hall where a conductor can have the virtual presence of all or a selective number of players participating from all over the globe for rehearsals; (5) a house, a shop, or a storage facility where a user can do security checks, identify product availability or determine inventory levels of various items; and (6) navigating an aircraft, conducting a train, or driving a motor vehicle where the virtual environment is created for the cockpit, the locomotive and the driver seat, respectively. A VRE service could be for terminal mobility as well as personal mobility. It could also be set up in a limousine, hotel, airport, or at a home or office.

According to one embodiment of the present invention, there is disclosed a virtual reality system that includes at least one virtual reality environment user equipment, and at least one virtual reality environment core system in wireless communication with the at least one virtual reality environment user equipment. The system also includes a virtual reality environment episode management entity, in communication with the at least one virtual reality environment core system, where the virtual reality environment episode management entity is operative to forward virtual reality data representing an environment to the at least one virtual reality environment user equipment, thereby facilitating a virtual reality episode.

According to one aspect of the present invention, the at least one virtual reality environment user equipment is operative to capture the virtual reality data in real-time. According to another aspect of the present invention, the at least one virtual reality environment user equipment is operative to display the virtual reality data in real-time According to yet another aspect of the present invention, the environment is an actual physical environment. Additionally, the virtual reality episode may be conducted between a plurality of virtual reality environment user equipment. Further, the system can comprise a virtual reality environment access system, where the virtual reality environment access system facilitates the wireless communication of the at least one virtual reality environment user equipment with the at least one virtual reality environment core system.

According to another aspect of the invention, one of the at least one virtual reality core systems includes a virtual reality entity subscription database. Moreover, the virtual reality environment episode management entity may be located within one of the at least one virtual reality environment core system.

According to another embodiment of the present invention, there is disclosed a method of enabling the real-time conduction of a real-time virtual reality episode. The method includes the steps of receiving real time virtual reality data at a virtual reality environment (VRE) episode management entity, where the virtual reality data is representative of an actual physical environment, determining, at the VRE episode management entity, that the virtual reality data is associated with a virtual reality episode, and forwarding at least a portion of the virtual reality data to a VRE user equipment participating in the virtual reality episode, where the VRE user equipment is in wireless communication with the VRE episode management entity.

According to one aspect of the present invention, the method includes capturing in real time virtual reality data representative of an actual physical environment prior to receiving the real time virtual reality data at a virtual reality environment (VRE) episode management entity. According to another aspect of the invention, capturing in real time virtual reality data includes capturing real time audio associated with the actual physical environment. Additionally, capturing in real time virtual reality data may include capturing in real time virtual reality data representative of an actual physical environment located geographically distant from the VRE user equipment.

According to yet another aspect of the present invention, the method further includes identifying the VRE user equipment as participating in the virtual reality episode prior to forwarding at least a portion of the virtual reality data to the VRE user equipment. The method may also include the step of determining the location of the VRE user equipment prior to forwarding at least a portion of the virtual reality data to the VRE user equipment. Moreover, according to another aspect of the invention, determining the location of the VRE user equipment comprises querying a database for the location of the VRE user equipment.

According to yet another embodiment of the present invention, there is disclosed a virtual reality system that enables the real-time conducting of a real-time virtual reality episode. The system includes at least one virtual reality environment user equipment (VUE), associated with at least one user, at least one virtual reality environment core system (VCS), where the at least one VCS has a pre-existing relationship with one of the at least one VUE and the at least one user; and a virtual reality environment episode management entity (VEME), in communication with the at least one user and the VCS, where the VEME forwards real-time virtual reality data representative of an actual physical environment to the at least one VUE associated with the at least one user.

According to yet another embodiment of the present invention, there is disclosed a method of participating in a real-time virtual reality episode. The method includes the steps of providing a virtual reality environment (VRE) user equipment, where the VRE user equipment captures virtual reality data representing an actual physical environment associated with a first user; and wirelessly transmitting the virtual reality data to a second user participating in the virtual reality episode, where the second user is geographically remote from the first user.

According to one aspect of the invention, the method further includes receiving, from the second user, data representing one or more actions performed by the second user. According to another aspect of the invention, the step of wirelessly transmitting occurs automatically after the VRE user equipment captures the virtual reality data.

BRIEF DESCRIPTION OF THE DRAWINGS

Figure 1:
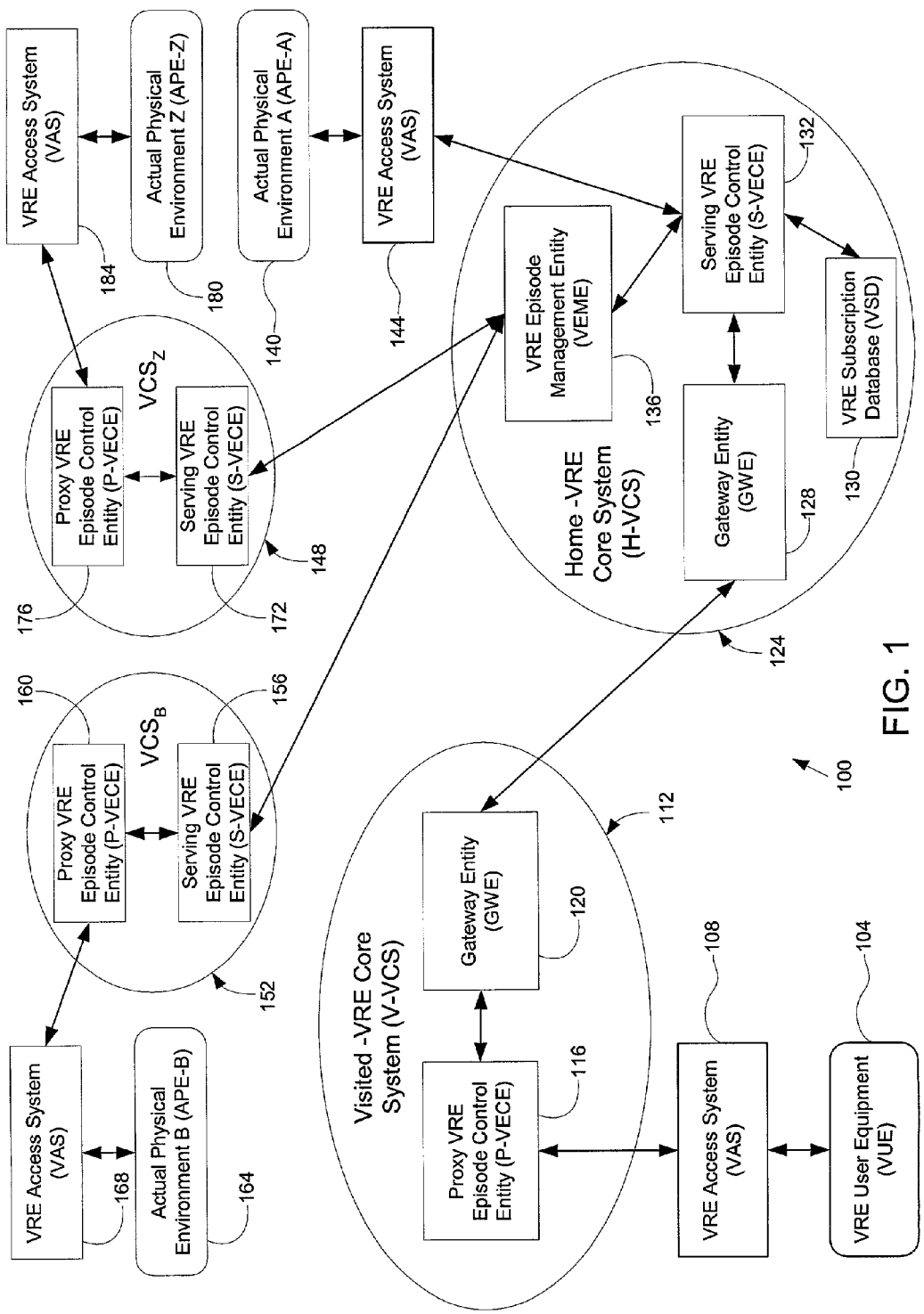

Having thus described the invention in general terms, reference will now be made to the accompanying drawings, which are not necessarily drawn to scale, and wherein:

FIG. 1 shows a block diagram of a virtual reality system, according to one embodiment of the present invention.

Figure 2:
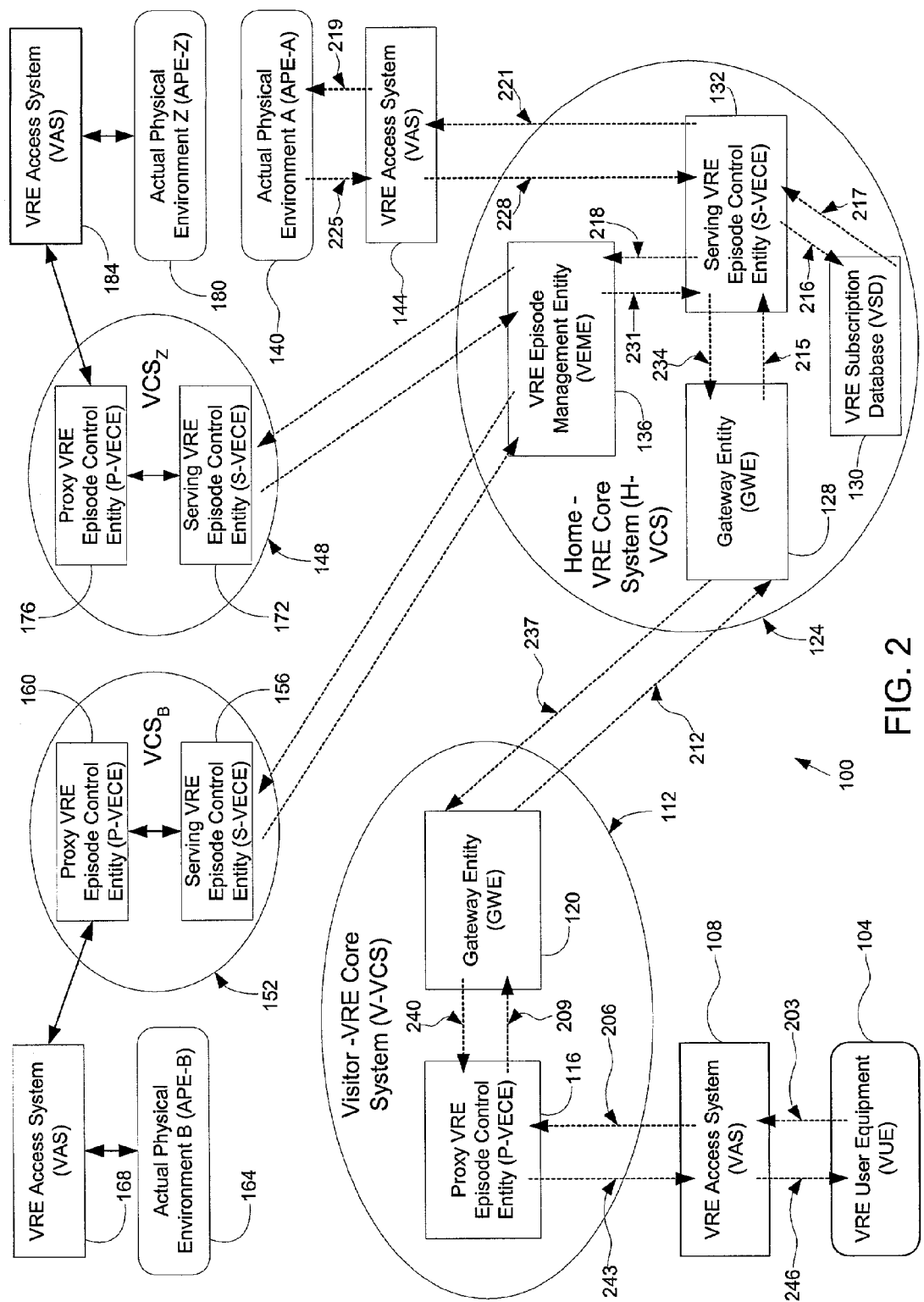

FIG. 2 shows a flow chart illustrating the process flow of communications in the virtual reality system of FIG. 1, according to one aspect of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Referring now to FIG. 1, a virtual reality system 100 of the present invention is illustrated that facilitates the establishment and conduction of a real-time virtual reality episode. The virtual reality system 100 includes three primary components: VRE User Equipment, VRE Access Systems, and VRE Core Systems. VRE User Equipment (VUE) 104 represents one or more end point devices used by one or more users to transmit virtual reality data describing an Actual Physical Environment (APE) and/or to receive data for establishing a VRE episode. The VUE 104 may comprise hardware, software, or a combination thereof. The VUE 104 may be a handset, headset, helmet, gloves, bodysuit, desk, chair, keyboard, mouse, screen, video camera, recording device, mechanical armature, ultrasonic sensor, magnetic tracker, optical position tracking system, or similar equipment well known in the art for displaying, transmitting and/or receiving information representative of an APE. It should also be appreciated by those of skill in the art that the VUE 104 may also comprise any combination of such tools. The VUE 104 is preferably capable of both capturing and displaying virtual reality data, which includes audio and video data that represents an environment, such as an actual physical environment. The virtual reality data also includes data used by the system to identify the VUE and the virtual reality episode associated with video and audio data, as well as data necessary for the reconstruction and/or transmission of the video and audio data across a network, as will be explained in greater detail below. According to one preferred embodiment of the present invention, the VUE 104 is primarily a software driven device which is controlled and/or manned by one or more users and/or networks, and is used as an end point in the creation and provisioning of desired VRE services related to various applications (e.g., education, entertainment).

Referring again to FIG. 1, the VUE 104 is in communication with a VRE Access System (VAS) 108, which is an intermediate component of the VRE system linking the VUE 104 to a VRE Core Network System (VCS) 112, which is described in greater detail below. The VAS 108 may be in direct communication with the VUE 104 via a hardwired or network connection, or can be in communication with the VUE 104 via a wireless connection, such as a fixed terrestrial or satellite radio access system. Although it is preferred that the VAS 108 communicate with the VUE 104 via a wireless connection, thereby enabling the mobility of the VUE 104, it should be appreciated that conducting a virtual reality episode requires substantial bandwidth. As a result, it is preferred that the VUE 104 and VAS 108 be connected by a wireless transmission path that provides high transmission and reception speed for both the VUE 104 and VAS 108. Such high speed transmission paths are well known in the art. However, it should be appreciated that as higher bandwidths become available for conventional wireless systems and devices, these systems and devices may be used to facilitate the communication between the VUE 104 and VAS 108, as well as between other components within the system 100 of the present invention.

The VAS 108 provides the VUE 104 access to the VCS 112, which is a backbone system that, in conjunction with the VUE 104 and VAS 108, forms the VRE system 100 and facilitates the establishment of VRE episodes between diverse users and APEs that may be geographically distant. Therefore, each VCS includes one or more network communication elements facilitating the communication between VUEs and other elements of the system 100. As is illustrated in FIG. 1, there can be more than one VCS system involved in establishing a VRE episode. The system 100 of FIG. 1 includes four VCS components, V-VCS 112, H-VCS 124, $VCS_B$ 152, and $VCS_Z$ 148.

It should be appreciated that $VCS_B$ 152 and $VCS_Z$ 148 are intended to illustrate that additional VCS components may also be included in the system 100. As an illustrative example, using the VCSs in the system 100 of FIG. 1, a physician associated with VUE 104 may participate in a virtual reality episode with physicians having respective VUEs at two remote locations, such as at Actual Physical Environment B (APE-B) 164 and Actual Physical Environment Z (APE-Z) 180. Therefore, virtual reality data (e.g., video and audio data) is transmitted in between each VCS, and forwarded to each respective VUE to conduct the virtual reality episode. To determine where to transmit the virtual reality data, each VCS contains a number of functional elements, discussed next with reference to FIG. 1.

According to one aspect of the invention, a user and/or VUE has a subscription with at least one VCS in the system 100, and each VCS is be a home and/or visitor VCS. Where the user and/or the user's VUE 104 has a pre-established subscription affiliation with a VCS, the VCS is labeled as a home VCS. For instance, in FIG. 1 H-VCS 124 represents a home VCS because the user and/or VUE 104 has a pre-established relationship with the H-VCS 124, such that the H-VCS 124 recognizes the user and/or VUE 104 and maintains rules that govern the user's or VUE's 104 activities in the system 100. For instance, the H-VCS 124 maintains rules that indicate whether a user or VUE 104 is authorized to participate in or establish a virtual reality episode, and if so, to what extent the user or VUE 104 may be involved. The H-VCS 124 also maintains rules indicating the type of information that may be sent to the VUE 104 based upon the capability of the VUE 104 to receive certain types of information. Therefore, it will be appreciated that the H-VCS will include a processor, in communication with at least one look-up table or database, for storing and retrieving rules associated with a user or VUE that has a relationship with the H-VCS. Furthermore, the H-VCS includes a database that contains all the VRE service subscription information data related to the user and/or the VUE 104. This VRE Subscriber Database (VSD) 130 is described in greater detail below and is similar to a home location register in wireless communication systems (and to a HSS in a 3G system).

A visitor VCS (V-VCS) 112 is the network system which the VUE 104 is presently visiting and in communication (e.g., wirelessly) with via a VAS. It is a VCS with which the user and/or the user's VUE 104 does not have a subscription affiliation. For instance, where the VUE 104 is a wireless device, a visitor VCS is comparable to a wireless visitor network that does not include a home location register for the wireless device. It will be appreciated by those of ordinary skill in the art that a wireless VUE can move in between multiple visitor VCSs when the wireless device is in motion. Therefore, a handoff function is performed when the user and/or VUE switches visitor systems, where the handoff function is similar to that handoff performed when a cellular or wireless telephone moves between cells. The home VCS, however, remains the same for a given user and/or VUE 104 regardless of its location in the system 100. Additionally, because a VCS may be in communication with multiple users' VUEs, a VCS can simultaneously act as a home VCS for one user and a visitor VCS for another user, where the prior user has a subscription with the VCS and the latter user does not. Because the system 100 allows a user to participate in a virtual reality episode regardless of each persons location (including while in motion), virtual reality episodes are available for virtually every person for whom there is VUE.

According to a preferred embodiment of the invention, within each VCS of FIG. 1 is a Gateway Entity (GE) 120, 128, which is a boundary functional entity within each VCS that facilitates the communication of messages between each VCS. The GWE is also the connecting point of all VECEs in a VCS network to the GWE of another VCS, and is the point of entry and exit for all VRE episode control signaling messages to and from a VCS. The GWE functions as a firewall, hides the structure of its underlying network, and facilitates the flow and routing of the VRE signaling traffic. For instance, because each VCS may format or transmit virtual reality data differently, the GWE may be used to translate the virtual reality data into virtual reality data useful to the VCS and components (e.g., VUE) downstream from the VCS. The functions of each GWE is well known to those of skill in the art. However, because the GWE's role as a security and performance enhancing element is non-essential, it will be appreciated that the VRE systems may be constructed without a GWE (e.g., $VCS_Z$ and $VCS_B$) to reduce system costs.

As illustrated in FIG. 1, a VCS includes three primary elements, including a Serving VRE Episode Control Entity (S-VECE), a Proxy VRE Episode Control Entity (P-VECE), and a VRE Subscription Database (VSD). It should be appreciated that although each of the elements are not illustrated in each of the VCS blocks 112, 124, 152 and 148 of FIG. 1, and are not necessary to every virtual reality episode (as in the episode illustrated in FIG. 2), each of these elements resides in each VCS of FIG. 1. A VRE Episode Management Entity (VEME) 136 is a fourth and additional element that may be located within H-VCS 124. The function of each of these elements are described in detail below.

According to one aspect of the present invention, there is a 1-to-n correspondence between the VECE (either P-VECE or S-VECE) and VUEs, such that one VECE may be located within a VCS for communicating with a plurality of VUEs. Principally, the S-VECE is in charge of controlling a virtual reality episode associated with a VUE, such as VUE 104, and a P-VECE, acting on behalf of the S-VECE, is the first point of VRE service control signaling in the V-VCS. As illustrated in FIG. 1, at the time of the VUE's 104 registration with the V-VCS 112, a P-VECE 116 is assigned to attend and monitor, on behalf of the S-VECE 132, all requests received from and transmitted to the VUE 104. These requests include requests to join a virtual reality episode, requests for virtual reality data, and similar requests associated with participation in a virtual reality episode. The P-VECE performs this function because the VUE 104 does not have a pre-established relationship with the VCS 112. Therefore, although V-VCS 112 may be a H-VCS for other VUE's with which the V-VCS 112 has a pre-established relationship, the S-VECE (not illustrated) within the V-VCS 112 is not used to facilitate communication between the VUE 104 and other elements of the system 100 because the V-VCS 112 is not the home VCS of the VUE 104.

More specifically, the function of the S-VECE 132 is to control the virtual reality episode by keeping track of the VUE's 104 status, such as the VUE's 104 location, connectivity, and the like. The S-VECE 132 authenticates the VUE 104 and queries VUE's VSD 130 for the services that can be offered to the VUE 104 during a VRE episode. Furthermore, during a virtual reality episode, the S-VECE 132 maintains the current P-VECE to which the VUE 104 is in communication (in FIG. 1, P-VECE 116), such that the S-VECE 132 can forward messages to the VUE via GWEs 124 and 128. Therefore, it will be appreciated that unlike the S-VECE 132, which remains the same during the time that a VRE service episode is in progress, the P-VECE 116 does not necessarily remain the same, as the VUE 104 may move within the V-VCS 112 or from the V-VCS 112 to another, depending upon the mobility range of the VUE 104. As noted above, where the VUE 104 is a mobile device VUE movement may require a hand-off, as is well known to those of ordinary skill in the art of wireless communications. Therefore, each time the device changes from one visitor VCS to another visitor VCS, the S-VECE 132 is updated according to well-known hand-off procedures such that the S-VECE 132 can maintain the status of the VUE 104 and forward information to the VUE 104.

As illustrated in FIG. 1, for a single VRE episode, there may be more than one VCS. Depending on the number of end points (e.g., VUEs) participating in the episode, their geographical distribution, and their mobility, each end point or each VUE may be connected to a separate VCS through a separate P-VECE and S-VECE. A VUE, either fixed or mobile, at any given point in time is located in an APE. This APE is the physical environment, system or location from which the actual sounds and sights are taken by a VUE device. The APE is converted to a virtual reality data stream of virtual reality data and is transmitted to another VUE device. FIG. 1 presents a few examples of the APE/VUE such as APE-A 140, APE-B 164, and APE-Z 180 and also shows an example of creating the virtual reality environment at the VUE 104 by establishing a VRE episode within the VRE system 100.

As illustrated in FIG. 1, $VCS_B$ 152 and $VCS_Z$ 148 represent VCSs, containing both S-VECEs and P-VECEs. Therefore, where VUE, such as VUE 104, wishes to participate in a virtual reality episode with a VUE at APE-B 164, the S-VECE 132 communicates with serving VECE 156 to determine the location of the VUE, and thereafter, the S-VECE 156 communicates (via GWEs, not illustrated) with the requisite P-VECE 160 to establish communications with the VAS 168 and VUEs located at APE-B 164. A similar scenario occurs for establishing communication with a VUE at APE-Z 180, where S-VECE 172 communicates with a VUE and APE-Z 180 via a P-VECE 176 and a VAS 184. Therefore, it will be appreciated that $VCS_B$ and $VCS_Z$ each, is both host and home to APE-B/VUE 164 and APE-Z/VUE 180, respectively. As such each represents blocks similar to the combined V-VCS 112 and H-VCS 124.

Also illustrated in the H-VCS 124 of FIG. 1 is a VRE Episode Management Entity (VEME) that manages, coordinates, synchronizes, and maintains all the events and VRE users' links within a VRE episode. As such, the VEME 136 is a multimedia management, control and operations center interfacing with the S-VECE of each VUE and the S-VECE of each actual physical environment (APE) that is involved in the virtual reality episode. The VEME 124 may reside in either the VUE's H-VCS 124 or on an independent external platform operated by a third party service provider with which the VUE user has VRE service subscription. The VEME's 124 various functions are performed by a one or more components within the VEME 124. The functions includes initiation of a VRE episode, negotiations for the type and class of VRE services, maintaining the procession of the episode, adding and/or dropping a VUE to/from an established episode, terminating the episode, and finally collecting charging data (from participating S-VECEs) and preparing a single charging record for the originating party(ies) as well as other participants. Each or any combination of these functions may be performed by a functional entity housed in one or more physical entities.

It should be appreciated by those of ordinary skill in the art that the list of aforementioned VEME functions is not exhaustive. Additionally, in performing these functions, the VEME may leverage the use of well-known externally existing programs in compatibility with network operators/service providers' embedded systems (e.g., charging and accounting). In such cases, all functions will be performed in coordination and conjunction with the execution of the internal entities under the control of a virtual episode service logic program (not illustrated) within the VEME 124. Furthermore, as the need for customization and enhancements arises, more functions may be added to the VEME 124.

Next, the process flow of communications in the virtual reality system 100 of the present invention will be described in detail with reference to FIG. 2, which shows communications transmitted in the system shown in FIG. 1, according to one illustrative embodiment of the present invention. First, after the VUE 104's attachment to and registration with the V-VCS 112, a VRE set-up procedure is initiated when an episode request is transmitted 203 from the VUE 104 to the VAS 108, and from the VAS 108 to 206 the P-VECE 112. Upon recognizing the request for establishing a VRE episode, the P-VECE 116 forwards the request 209 to the GWE 120. The GWE 120 then forwards the request 212 to the GWE 128 at the VUE 104's H-VCS 124 for transmission 215 to the serving VRE service control attendant, or S-VECE 132.

Upon recognizing the request for establishing a VRE Episode and obtaining VUE 104's service subscription information data from the VSD 130 (via messages 216 and 217), the S-VECE 132 sends 218 a request for VRE episode set-up to the VEME 136. Based on the information and request received from the S-VECE 132, the VEME 136 identifies all end points and their serving VECEs involved in the VRE, and dispatches requests for the VRE episode set-up to various serving VECEs 172 and 156 which communicate with APE endpoints 180 and 164 via P-VECE 176 and VAS 184 and via P-VECE 160 and VAS 168, respectively. The request for the VRE episode set-up is also transmitted 221, 219 to endpoints within the VUE 104's own home network (e.g., APE-A 140) via a VAS 144.

Based on the request received from the VEME 136, each of the APE/VUEs then sends a response to inform their corresponding P-VECEs (forwarded to the S-VECEs) of their readiness to join in the VRE episode. Once all of the participants in the VRE episode have been notified of the VRE episode, and have agreed or responded with a request to join the episode, the S-VECEs 156, 148 and 132 notify the VEME 136 that the participants have agreed to participate in the episode. The VEME 136 then responds 231 with a confirmation, or Episode Response message, to the S-VECE 132 in the H-VCS 124. The S-VECE 132 then forwards 234, 237, and 240 the episode response message to the P-VECE 116 in the VUE 104's visitor network, V-VCS 112. The P-VECE 116, in turn, forwards the response message to the VUE 104. After all necessary protocol acknowledgements and notifications are completed, as is well known in the art, all necessary bearers are established (at a desired/requested level of quality of service) and the VRE episode is set-up for the VRE service delivery. The content of the VRE episode request message contains information on requester or originator of the episode, VRE service type, parties involved, service quality level, tariff information, and the like. It should be appreciated that some parameters in the message may be optional. The actual bearer establishment for the VRE episode is carried out in a different plane within the VRE system 100. This process includes the establishment of the bearers according to the negotiated/agreed level for the quality of service (e.g., speed and bandwidth) between the end points under the monitoring and control of their corresponding S-VECEs.

It should be appreciated that the communication process flow described in detail herein may also include a protocol response to each action request, acknowledging the request or sending an error response. It should also be appreciated that the procedure described here is generic, and the example above is protocol independent. A VRE episode control may be developed based on a number of existing and well known protocols, such as Session Initiation Protocol (SIP).

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A virtual reality system, comprising:
    at least one virtual reality environment user equipment (VUE) operative to capture and transmit real-world video and audio data and to display received virtual reality data representing an actual physical environment;
    at least one virtual reality environment core system (VCS), wherein: the core system is in communication with at least two virtual reality environment subscriber databases (VSD), one of which has a relatively local location and at least one of which has a relatively remote location; the virtual reality environment core system being in wireless communication with the at least one VUE, the core system being operative to access the relatively local VSD, to retrieve respective subscription information of the at least one VUE if the core system is a respective home core system of the at least one VUE, and to access at least one of the at least one relatively remotely located VSD to retrieve respective subscription information of the at least one VUE if the core system is a visited virtual reality core system relative to the at least one VUE; and
    a virtual reality environment episode management entity (VEME) which is in communication with the at least one virtual reality environment core system and is operative to forward the virtual reality data representing the environment to the at least one VUE and receive the real-world video and audio data from the at least one VUE, thereby facilitating a virtual reality episode.

2. The virtual reality system of claim 1, wherein the at least one virtual reality environment user equipment (VUE) is operative to capture the virtual reality data in real-time.

3. The virtual reality system of claim 1, wherein the at least one virtual reality environment user equipment (VUE) is operative to display the virtual reality data in real-time.

4. The virtual reality system of claim 1 further comprising:
    at least one additional VUE in hardwired communication with at least one of the at least one VCS.

5. The virtual reality system of claim 1, wherein the virtual reality episode is conducted between a plurality of virtual reality environment user equipment (VUE).

6. The virtual reality system of claim 1, further comprising:
    a virtual reality environment access system (VAS), wherein the virtual reality environment access system facilitates the wireless communication of the at least one virtual reality environment user equipment with the at least one virtual reality environment core system.

7. The virtual reality system of claim 1, wherein one of the at least one virtual reality core systems (VCS) comprises a virtual reality entity subscription database (VSD).

8. The virtual reality system of claim 1, wherein the virtual reality environment episode management entity (VEME) is located within one of the at least one virtual reality environment core system (VCS).

9. A method of enabling the real-time establishment and conduction of a real-time virtual reality episode (VRE), comprising:
    receiving a request for establishing a virtual reality episode (VRE) from VRE user equipment (VUE);
    accessing a relatively local virtual reality environment subscriber database (VSD) to retrieve subscription information associated with the VUE if an entity receiving the request is a respective home virtual reality core system of the VUE;
    accessing a relatively remote VSD to retrieve respective subscription information of the VUE if the entity receiving the request is a visited virtual reality core system (VCS) relative to the VUE;
    receiving real time virtual reality data at a virtual reality environment (VRE) episode management entity (VEME), wherein the virtual reality data is representative of an actual physical environment;
    determining, at a VRE episode management entity, that the virtual reality data is associated with the requested virtual reality episode; and
    forwarding, based on the accessed subscription information, at least a portion of the virtual reality data to the VUE, wherein the VRE user equipment is in wireless communication with the VRE episode management entity (VEME), and wherein the VRE user equipment (VUE) is operative to capture, transmit and display virtual reality data.

10. The method of claim 9, further comprising capturing and transmitting, in real time, virtual reality data representative of an actual physical environment prior to receiving the real time virtual reality data at a virtual reality environment (VRE) episode management entity (VEME).

11. The method of claim 10, wherein capturing in real time, virtual reality data comprises capturing real time audio associated with the actual physical environment.

12. The method of claim 10, wherein capturing in real time virtual reality data comprises capturing in real time virtual reality data representative of an actual physical environment located geographically distant from the VRE user equipment (VUE).

13. The method of claim 9, further comprising identifying the VRE user equipment (VUE) as participating in the virtual reality episode prior to forwarding at least a portion of the virtual reality data to the VRE user equipment (VUE).

14. The method of claim 9, further comprising determining the location of the VRE user equipment (VUE) prior to forwarding at least a portion of the virtual reality data to the VRE user equipment (VUE).

15. The method of claim 9, wherein determining the location of the VRE user equipment (VUE) comprises querying a database for the location of the VRE user equipment (VUE).

16. A virtual reality system that enables the real-time conduction of a virtual reality episode, comprising:
    at least one virtual reality environment user equipment (VUE) operative to capture and display virtual reality data, associated with at least one user;
    at least one virtual reality environment core system (VCS), wherein the at least one VCS has a pre-existing relationship with one of the at least one VUE and the at least one user;
    a plurality of virtual reality environment access systems (VAS), wherein each respective VAS of the plurality provides wireless connectivity for respective ones of the at least one VUE, whereby the respective VAS relays messages between the VUE and the at least one VCS; and wherein responsibility for providing connectivity is handed off from a first respective VCS to a second respective VCS if the respective ones of the at least one VUE move out of a first geographic region served by the first respective VCS and into a second geographic region that is served by the second respective VCS; and a virtual reality environment episode management entity (VEME), in communication with the at least one user and the at least one VCS, wherein the VEME forwards real time virtual reality data representative of an actual physical environment to the at least one VUE associated with the at least one user through wireless connectivity services of the respective VAS currently serving the at least one VUE of the at least one user based on VUE or user location and/or mobile link information maintained by the VEME.

17. A method of participating in a real-time virtual reality episode, comprising;

providing a virtual reality environment user equipment (VUE), wherein the virtual reality user equipment (VUE) captures and displays virtual reality data representing an actual physical environment associated with a first user;

wirelessly transmitting the captured virtual reality data to a first virtual reality environment access systems (VAS)

communicating the captured virtual reality data to intervening network elements including a second VAS accessing a relatively local virtual reality environment subscriber database (VSD) to retrieve subscription information associated with a second user participating in the virtual reality episode, if an entity in communication with the second user is a home virtual reality core system (H-VCS) of the second user;

accessing a relatively remote VSD to retrieve subscription information of the second user if the entity in communication with the second user is a visited virtual reality core system (V-VCS) relative to the second user; and wirelessly transmitting the virtual reality data from the second VAS to the second user as authorized by the subscription information associated with the second user, wherein the second VAS and the second user are geographically remote from the first user.

18. The method of claim 17, further comprising receiving, from the second user, data representing one or more actions performed by the second user.

19. The method of claim 17, wherein wirelessly transmitting occurs automatically after the VRE user equipment captures the virtual reality data.

20. A system that is operative to provide virtual reality data services to a subscriber using virtual reality environment user equipment (VUE), the system comprising:

a virtual reality environment episode management entity (VEME) that is operative to manage, coordinate, synchronize and maintain event information and mobile links between participants and information sources associated with a virtual reality episode;

a virtual reality environment control entity (VECE) that is operative to control virtual reality episodes associated with the subscriber or the VUE by accessing a local virtual reality environment subscriber database (VSD) if the VECE is a home VECE of the subscriber or VUE, or accessing a remote virtual reality environment subscriber database (VSD), if the VECE is a visited VECE relative to the subscriber or VUE, to determine subscription information associated with the subscriber and/or the VUE, and providing system access and or services to the VUE and relaying messages between the VUE and the VEME according to the subscriber information and the mobile links, and a virtual reality environment access system (VAS), wherein the VAS provides wireless connectivity for the VUE if the VUE is located in a respective geographic region served by the VAS, whereby the VAS relays messages between the VUE an the VECE;

wherein responsibility for providing connectivity is handed off from the VECE if the VUE moves out of a first geographic region served by the first VECE.

21. The system of claim 20 further comprising:

at least one additional virtual reality environment VECE that is operative to control virtual reality episodes associated with at least one additional subscriber using at least one additional VUE by accessing a local virtual reality environment subscriber database (VSD) if the VECE is a home VECE of the at least one additional subscriber or VUE, and accessing a remote virtual reality environment subscriber database (VSD), if the VECE is a visited VECE relative to the at least one additional subscriber or VUE, to determine at least one additional set of subscription information associated with the at least one additional subscriber and/or the at least one additional VUE, and providing system access and/or services to the at least one additional VUE and relaying messages between the at least one additional VUE and the VEME according to the subscriber information and the mobile links, and at least one additional virtual reality environment access system (VAS) associated with the at least one additional VECE, wherein each respective additional VAS provides wireless connectivity for at least one of the at least one additional VUE if the at least on additional VUE is located in a respective geographic region served by the respective additional VAS, whereby the respective additional VAS relays messages between the at least one additional VUE and a respective one of the at least one additional VECE; and wherein responsibility for providing connectivity is handed off from a first respective additional VAS to a second respective additional VAS if the at least one additional VUE moves out of a first additional geographic region served by the respective first additional VAS and into a second additional geographic region that is served by a second respective additional VAS.

22. The system of claim 21 further comprising:

a virtual reality environment gateway entity that is operative to provide boundary entity services that facilitate a communication of messages between the VECE and the at least one additional VECE, the boundary entity services including at least one of firewall services, hiding underlying network structure, facilitating the flow and routing of virtual reality episode control signals, and converting or translating signals or protocols between elements of the system.

* * * * *